United States Patent
Robinson, Jr.

(10) Patent No.: US 6,623,658 B1
(45) Date of Patent: Sep. 23, 2003

(54) ADDITIVE FOR CONTROLLING SECONDARY CONTAMINATES

(75) Inventor: Charles William Robinson, Jr., Manson, NC (US)

(73) Assignee: Industrial Chemical Consultants, Henderson, NC (US)

( * ) Notice: Subject to any disclaimer, the term of this patent is extended or adjusted under 35 U.S.C. 154(b) by 26 days.

(21) Appl. No.: 09/667,661

(22) Filed: Sep. 22, 2000

(51) Int. Cl.[7] .......................... C02F 5/12; B01D 17/02; B01D 17/05
(52) U.S. Cl. .......................... 252/180; 162/5; 516/136; 516/140; 524/922; 526/932
(58) Field of Search ................................ 516/136, 140; 252/180; 210/693; 162/5; 526/932; 507/222; 525/327.6; 524/922

(56) References Cited

U.S. PATENT DOCUMENTS

| | | | | |
|---|---|---|---|---|
| 4,357,207 A | * | 11/1982 | Yorke | 252/180 X |
| 4,786,364 A | * | 11/1988 | Tefft | 162/5 |
| 5,137,641 A | * | 8/1992 | Bhattacharyya et al. | 252/180 X |
| 5,213,693 A | * | 5/1993 | McGrow et al. | 252/180 X |
| 5,750,034 A | * | 5/1998 | Wong Shing et al. | 210/705 |
| 6,174,950 B1 | * | 1/2001 | Nzudie et al. | 252/180 X |

* cited by examiner

*Primary Examiner*—Richard D. Lovering
(74) *Attorney, Agent, or Firm*—MaCord Mason PLLC

(57) ABSTRACT

An additive for controlling the detrimental effects of secondary recycled contaminants in the papermaking process. In the preferred embodiment, the additive includes a first low molecular weight, cationic water-soluble polymer and a second low molecular weight, cationic, water-soluble polymer, wherein the first low molecular weight, cationic, water-soluble polymer and the second low molecular weight, cationic, water-soluble polymer are co-reacted. In the preferred embodiment, the effective amount of the additive is determined by measuring about a 50 PPM reduction in soluble charge of the liquid base after adding the additive to the liquid base. In the most preferred embodiment, the reduction in soluble charge is between about 50 and 150 PPM as measured by determining the electrophoretic mobility of the liquid base with and without the additive. In the preferred embodiment, the first low molecular weight, cationic, water-soluble polymer is a di-ammonium chloride polymer, such as DADMAC, and the second low molecular weight, cationic, water-soluble polymer is a polyacrylamide. The molecular weight of the additive is controlled to be less than about 25,000 cps but greater than about 18,000 cps.

13 Claims, 1 Drawing Sheet

ADDITIVE FOR CONTROLLING SECONDARY CONTAMINATES

BACKGROUND OF THE INVENTION (1) Field of the Invention

The present invention relates generally to papermaking and, more particularly, to an additive and a method for determining the effective amount of the additive needed to control the detrimental effects of secondary recycled contaminates which occur frequently during reprocessing recycled paper.

(2) Description of the Prior Art

Much of the materials that go into waste landfills are paper and paper based products, such as packaging. As landfill space becomes harder to find, recycling of paper products has been encouraged or dictated by federal, state and local governments. However, many problems arise in recycling paper fibers that would not have existed in making paper using virgin fibers. For example, a major problem is "stickies" which is the nickname for secondary fiber contamination.

Stickies are sticky spots, which show up on the paper and on the papermaking machine. Stickies are very detrimental to the paper making process. They interfere with drainage on the forming table and plug up the press felts and the dryer felts, which knocks the efficiency of the pressing and drying down substantially, thereby driving energy costs up. Stickies can also cause actual fiber breaks and sheet breaks on the paper machine and can actually bring a whole machine down.

A sheet break is the breaking of the continuous paper making process. When there is a sheet break on the machine, the fiber must be sent back to the refiners chest until the break can be rethreaded and the machine restarted. Because of the tremendous capital investment necessary for a papermaking machine, when the machine is not making any paper, the Company is not making any money.

Various additives have been tried to reduce the stickies but have met with limited success since the variability in the input for a recycled papermaking process makes choosing the right amount of additive for ever changing conditions extremely hard. Most of these attempts appear to be using strictly at homo-polymers and have met with limited success.

Thus, there remains a need for a new and improved additive to control the detrimental effects of secondary recycled contaminates which occur frequently during reprocessing recycled paper while, at the same time, providing a method for determining the effective amount of the additive.

SUMMARY OF THE INVENTION

The present invention is directed to an additive for controlling the detrimental effects of secondary recycled contaminants in the papermaking process. In the preferred embodiment, the additive includes a first low molecular weight, cationic water-soluble polymer and a second low molecular weight, cationic, water-soluble polymer, wherein the first low molecular weight, cationic, water-soluble polymer and the second low molecular weight, cationic, water-soluble polymer are co-reacted.

In the preferred embodiment, the effective amount of the additive is determined by measuring about a 50 PPM reduction in soluble charge of the liquid base after adding the additive to the liquid base. In the most preferred embodiment, the reduction in soluble charge is between about 50 and 150 PPM as measured by determining the electrophoretic mobility of the liquid base with and without the additive.

Also, in the preferred embodiment, the first low molecular weight, cationic, water-soluble polymer and the second low molecular weight, cationic, water-soluble polymer are cross-linking and form a co-polymer structure.

The first low molecular weight, cationic, water-soluble polymer is a di-ammonium chloride polymer, such as DAD MAC, and the second low molecular weight, cationic, water-soluble polymer is a polyacrylamide. The molecular weight of the additive is controlled to be less than about 25,000 cps but greater than about 18,000 cps.

Accordingly, one aspect of the present invention is to provide an additive for controlling the detrimental effects of secondary recycled contaminants in the papermaking process, the additive containing an effective amount of a low molecular weight, cationic water-soluble polymer.

Another aspect of the present invention is to provide an additive for controlling the detrimental effects of secondary recycled contaminants in the papermaking process, the additive including: a first low molecular weight, cationic, water-soluble polymer; and a second low molecular weight, cationic, water-soluble polymer, wherein the first low molecular weight, cationic, water-soluble polymer and the second low molecular weight, cationic, water-soluble polymer are co-reacted.

Still another aspect of the present invention is to provide an additive for controlling the detrimental effects of secondary recycled contaminants in the papermaking process, the additive including: a first low molecular weight, cationic, water-soluble polymer; a second low molecular weight, cationic, water-soluble polymer, wherein the first low molecular weight, cationic, water-soluble polymer and the second low molecular weight, cationic, water-soluble polymer are co-reacted; and wherein the effective amount of the additive is determined by measuring about a 50 PPM reduction in soluble charge of the liquid base after adding the additive to the liquid base.

These and other aspects of the present invention will become apparent to those skilled in the art after a reading of the following description of the preferred embodiment when considered with the drawings.

DESCRIPTION OF THE PREFERRED EMBODIMENTS

Figure 1:
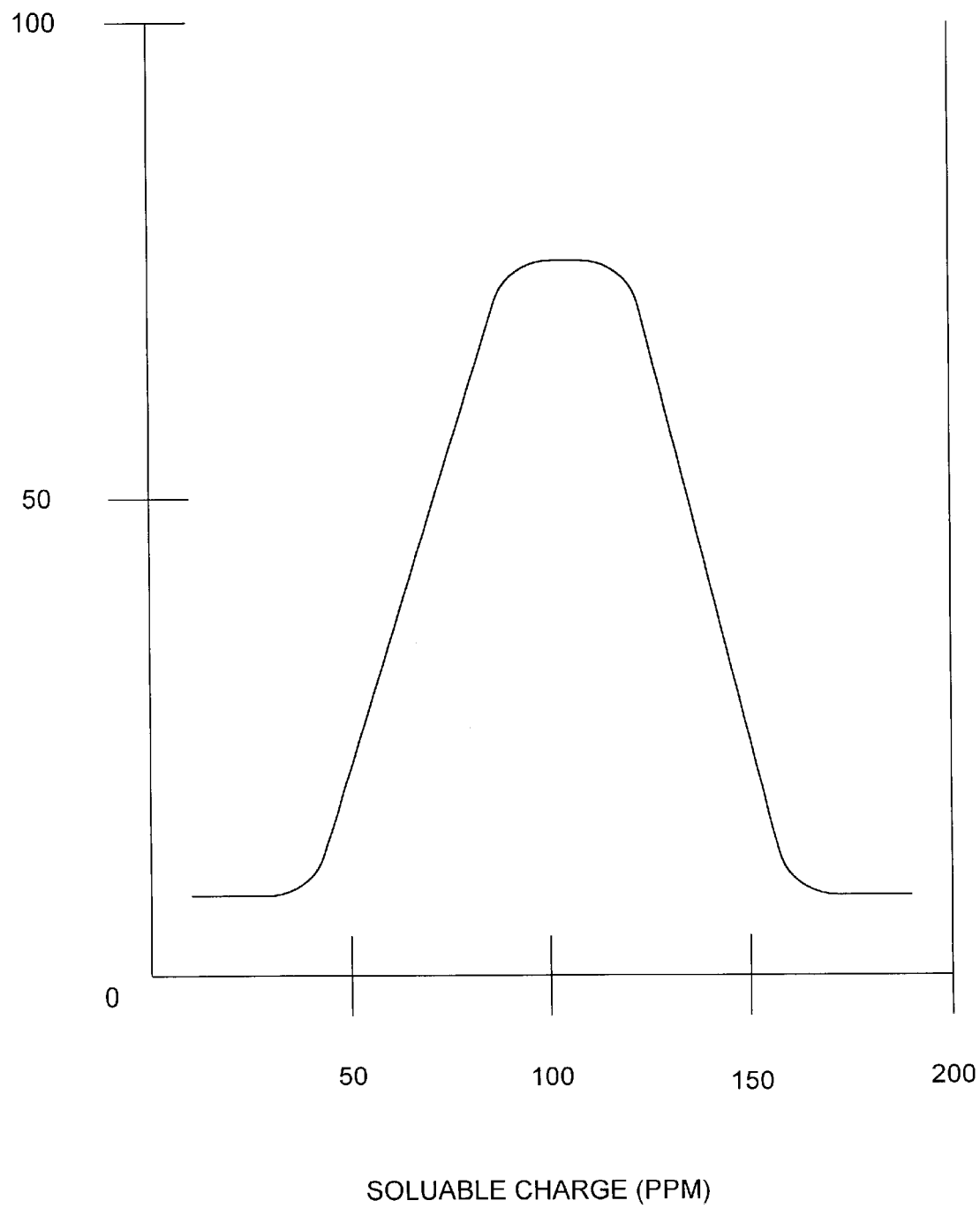
FIG. 1 is a graphical representation of the soluble charge window to control the detrimental effects of secondary recycled contaminants.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

According to the present invention, a low molecular weight cationic water-soluble co-polymer is added to the papermaking process for controlling the detrimental effects of secondary recycled contaminants. In the preferred embodiment, a soluble charge window is measured to control the effective amount of the additive.

In the preferred embodiment, the viscosity of the co-polymer is less than about 25,000 cps, but not to drop below 18,000 cps. If the viscosity goes above about 25,000 cps, the additive of the present invention may become too viscous to handle and then the molecular weight is such that it will not reduce the soluble charge. The higher the molecular weight, the longer the polymer chain, which reduces the number of available site to control as a soluble charge.

The soluble charge is separate from the fiber in the liquid base. When the molecular weight of the additive gets too high, it starts affecting the zeta potential of the fiber as opposed to reducing the soluble charge in the liquid base. Below about 18,000 cps, the additive appear to have little, if any, effect on the charge of the zeta potential. It has been discovered that the center points between 18,000–25,000cps are very specific for a certain amount of contaminants or a soluble charge. It is this narrow window which has been discovered that is important to control.

Specifically, if the soluble charge of the liquid base is controlled within that small window, those molecular weights of contaminants or anionic trash contaminants of the soluble charge of a similar molecular weight of the polymer, it appears to create a purging effect by attaching these small contaminates to the fibers which is carried out of the liquid base as the paper is being formed. By keeping down the amount of smaller particles in the liquid base, these particles do not conglomerate and form larger particles or stickies. It actually lets them be carried away by the paper, attaches them to the fiber and does not build up where the concentration would start-causing it to get worse.

According to the present invention, there should be at least about a 50 PPM reduction from the incoming liquid base when measuring the electrophoretic mobility of the solution. At th same time, the zeta potential should remain constant. Specifically, the amount of additive is ed to cause the soluble charge to drop but not the zeta potential.

According to the present invention, a standard electrophoretic mobility test is first run without any additive added and then re-run the test after adding an initial amount of additive. Thus, the total soluble charges with none of the co-polymer added to it is first determined. Then the additive is begun to be added to the test samples and re-tested to determine how much additive it takes to get the desired reduction in soluble charge.

The test is also a relative amount of change test. For example, if it started off with 800 PPM, it has been discovered that the soluble charge should be reduced any lower than 650 PPM. However, if it started at 650 PPM, it might go as low as 500. However, the total reduction in charge should be less than about 150 PPM. It is this window of reduction that is enough for purging, but if the amount of additive is increased any higher, the liquid base would maybe go into conglomeration again as it starts picking up larger particle sizes which, in turn, would start distorting the formation of the sheet.

As can be seen in FIG. 1, the "window" for effectively purging the secondary contaminates is relatively narrow and generally is most effective between about a 50 and 150 PPM reduction in soluble charge.

In the preferred embodiment, the additive is a mixture of at least two of low molecular weight, cationic, water-soluble polymers. The first cationic, water-soluble polymer is a di-ammonium chloride polymer, generally known as DADMAC. The second low molecular weight, cationic, water-soluble polymer is a polyacrylamide. The reacted co-polymer mixture of DADMAC and polyacrylamide is available from Secodyne, a subsidiary of SNF Holding Company of Riceboro, Ga.

In the preferred embodiment, the additive is formed in a single stage a reactor. The acrylamide and the ammonium chloride are preformed separately and are separate entities when they go into the reactor. The reactor is brought up to temperature and pressure. The molecular weight is controlled by the cook time. Similar chemistry was used in the past for control of drainage and retention on virgin fiber making processes but was discontinued as the higher molecular weight additives became available in the 80's and on up in to the 90's.

In particular, with these two materials, there is cross-linking which, in addition, forms a structured polymer. When the polymers link together, a structured polymer triangulation cross-linking formation is formed wherein the combination of the two produces better results than either one by itself. The actual structure formed appears inherent in the chemical makeup of the DADMAC and the polyacrylamide.

The importance of this relationship can be seen in the following Table where refining, strength and drainage were measured on a 1–5 scale, with 5 being the best result, for DADM-AC and polyacrylamide alone and together in 3 different ratios.

TABLE

| Example No | Description | Relative Refining Strength and Drainage |
|---|---|---|
| 1 | DADMAC alone | 1.5 |
| 2 | polyacrylamide alone | 2 |
| 3 | 25/75 DADMAC/poly | 3.5 |
| 4 | 75/25 DADMAC/poly | 3.5 |
| 5 | 50/50 DADMAC/poly (the preferred embodiment) | 5 |

As can be seen, any combination of DADMAC and polyacrylamide performs better than either material alone. In addition, a blend of 50/50 performs even better than less equal ratios.

The amount of dry active solids may affect the effectiveness of the additive. Dry active solids are determined by putting a water-soluble polymer in an oven and dry it out completely to drive off all the moisture. The active solids is what's left,the percent of solids in the chemical compound of polymer itself, after all of the water has been dried off.

In the present invention, about 8%–10 wt. %, but no greater than 10% is preferred. If the active solids goes greater than 10%, the viscosity of the additive starts going up since the amount of dry active solids is proportional to the viscosity because is also proportional to the molecular weight. Thus, 8–10 wt. % roughly corresponds to the 18,000 and 25,000 cps. It is close but not a direct proportion.

Once the correct amount of additive is determined, for example running 2 lbs. per dry ton, the bulk additive is diluted with water and fed with a progressive cavity pump located upstream and pumped the bulk source, such as from a tank or a semi bulk tank container source of storing the polymer into the liquid base of the papermaking machine.

The drainage may also be an indication of how-close-the amount of additive is to being right. If it gets wetter, the steam usage usually start to go up in the dryers, if it gets dryer (which is desirable), the steam usage will go down in the dryers. The dryers use a feedback loop to control the amount of steam. A moisture sensor senses the final paper moisture, like 6 wt. % or 7%, and that signal is used to controls amount of steam sent to the dryers in the last section of the paper machine. If the papermaking machine is running steady state and the steam usage started creeping up, it may be used to tell the operator that he may need to increase slightly the amount of additive to the liquid base slightly.

This may be used to provide a control system that monitors steam usage and at least alert the operator that he may want to go ahead and run the test of the present invention quickly. In addition, at particular plant, the control system could be used to actually slightly increase the amount of additive and after some delay, because this might take some time to go through the system, it might then bring it down some, or it might even add some, slightly more, but no more than a certain amount set up to an upper limit.

While this is a possibility for automatically for controlling the addition of the additive just by watching steam usage, there are many other factors that are involved and response time may be very critical. Accordingly, refining usually is still controlled by the operator after reviewing the results of a physical test, such as concora and ring-crush tests.

However, it is expected at the same time, if the operator sees this additive going in, they will see their concora and ring-crush increase slightly, or considerable amounts. Therefore, in turn, the operator could start backing out on the refiners, reducing the refining and at the same time, start freeing the sheet up or it will start draining better itself also, and that way also, there would be a reduction of steam usage. Thus, by looking at the refiners themselves and looking at the amount of refiner horsepower being used and that might be another way of controlling the amount of additive that may be necessary because the amount of horsepower required could go up if there was not enough additive in the liquid base.

On the Number 1 machine at Plant A, the efficiency has increased substantially with the additive of the present invention. Efficiency is up time. The run time is the budget of so many tons a day. This machine is budgeted for 480–482 tons a day, and the cost is calculated around that. Now, if it runs over the 482, that is a bonus. However, over a period of a year, or of 90 days, or of 30 days, efficiency can be calculated based on budgeted tons divided into actual tons. Efficiency relative to 482 prior to starting to add the additive of the present invention was probably in the high mid-high 80's is now probably running 95%. It probably picked the machine efficiency up a good 10% or about 50 tons/day.

Certain modifications and improvements will occur to those skilled in the art upon a reading of the foregoing description. It should be understood that all such modifications and improvements have been deleted herein for the sake of conciseness and readability but are properly within the scope of the following claims.

I claim:

1. An additive for controlling the detrimental effects of secondary recycled contaminants in the papermaking process, said additive containing an effective amount of a low molecular weight, cationic water-soluble polymer, wherein said polymer is a di-ammonium chloride polymer and the viscosity of said additive is between about 18,000 cps and 25,000 cps.

2. An additive for controlling the detrimental effects of secondary recycled contaminants in the papermaking process, said additive comprising:
   (a) a first low molecular weight, cationic, water-soluble polymer wherein said first polymer is a di-ammonium chloride polymer
   (b) a second low molecular weight, cationic, water-soluble polymer wherein said second polymer is a polyacrylamide, wherein said di-ammonium chloride polymer and said polyacrylamide are co-reacted; and
   (c) wherein the viscosity of said additive is between about 18,000 cps and 25,000 cps.

3. The additive according to claim 2, wherein said di-ammonium chloride polymer is DADMAC.

4. The addictive according to claim 2, wherein said first low molecular weight, cationic, water-soluble polymer and said second low molecular weight, cationic, water-soluble polymer are cross-linking.

5. The additive according to claim 4, wherein said first low molecular weight, cationic, water-soluble polymer and said second low molecular weight, cationic, water-soluble polymer form a co-polymer structure.

6. The additive according to claim 2, wherein the dry active solids of said additive is up to about 10 wt %.

7. The additive according to claim 6, wherein the dry active solids of said additive is between about 8 and 10 wt %.

8. An additive for controlling the detrimental effects of secondary recycled contaminants in the papermaking process, said additive comprising:
   (a) a first low molecular weight, cationic, water-soluble polymer wherein said first polymer is a di-ammonium chloride polymer;
   (b) a second low molecular weight, cationic, water-soluble polymer wherein said second polymer is a polyacrylamide, wherein said di-ammonium chloride polymer and said polyacrylamide are co-reacted; and
   (c) wherein the effective amount of said additive is determined by measuring about a 50 PPM reduction in soluble charge of the liquid base after adding said additive to the liquid base and the viscosity of said additive is between about 18,000 cps and 25,000 cps.

9. The additive according to claim 8, wherein said di-ammonium chloride polymer is DADMAC.

10. The additive according to claim 8, wherein said first low molecular weight, cationic, water-soluble polymer and said second low molecular weight, cationic, water-soluble polymer are cross-linking.

11. The addictive according to claim 10, wherein said first low molecular weight, cationic, water-soluble polymer and said second low molecular weight, cationic, water-soluble polymer are cross-linking.

12. The additive according to claim 8, wherein the dry active solids of said additive about 10 wt %.

13. The additive according to claim 12, wherein the dry active solids of said additive is between about 8 and 10 wt %.

* * * * *